United States Patent
Cho et al.

(10) Patent No.: US 7,747,429 B2
(45) Date of Patent: Jun. 29, 2010

(54) DATA SUMMARIZATION METHOD AND APPARATUS

(75) Inventors: Jeong Mi Cho, Suwon-si (KR); Hyoung Gook Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 842 days.

(21) Appl. No.: 11/589,134

(22) Filed: Oct. 30, 2006

(65) Prior Publication Data

US 2007/0282597 A1 Dec. 6, 2007

(30) Foreign Application Priority Data

Jun. 2, 2006 (KR) ............... 10-2006-0049748

(51) Int. Cl.
G06F 17/20 (2006.01)
G06F 17/27 (2006.01)
G06F 17/21 (2006.01)

(52) U.S. Cl. ............... 704/9; 704/1; 715/254
(58) Field of Classification Search ............... None
See application file for complete search history.

(56) References Cited

U.S. PATENT DOCUMENTS

| | | | |
|---|---|---|---|
| 6,198,511 B1 | 3/2001 | Matz et al. | |
| 6,317,708 B1 | 11/2001 | Witbrock et al. | |
| 6,338,034 B1 * | 1/2002 | Ishikawa et al. | ............... 704/9 |
| 6,580,437 B1 | 6/2003 | Liou et al. | |
| 6,845,485 B1 | 1/2005 | Shastri et al. | |
| 6,961,954 B1 * | 11/2005 | Maybury et al. | ............... 725/53 |
| 7,251,781 B2 * | 7/2007 | Batchilo et al. | ............. 715/210 |
| 7,475,334 B1 * | 1/2009 | Kermani | ..................... 715/229 |
| 2002/0051077 A1 * | 5/2002 | Liou et al. | .................. 348/465 |
| 2002/0078090 A1 * | 6/2002 | Hwang et al. | ............... 707/513 |
| 2002/0126143 A1 | 9/2002 | Bae et al. | |
| 2005/0188411 A1 | 8/2005 | Dacosta | |
| 2005/0278747 A1 | 12/2005 | Barton et al. | |

FOREIGN PATENT DOCUMENTS

| | | |
|---|---|---|
| JP | 11-102372 | 4/1999 |
| JP | 2004-118545 | 4/2004 |

(Continued)

OTHER PUBLICATIONS

Korean Patent Office Action, mailed Nov. 30, 2007 and issued in corresponding Korean Patent Application No. 10-2006-0049748.

*Primary Examiner*—Matthew J Sked
(74) *Attorney, Agent, or Firm*—Staas & Halsey LLP

(57) ABSTRACT

A method of generating caption abstract, including: generating a target text from a predetermined caption, analyzing a morpheme of a word included in the target text, and analyzing a grammatical structure of the target text by referring to the morpheme; extracting and removing low content words from the target text by using the morpheme or information on the grammatical structure and determining a main predicate; extracting a major sentence component with respect to the main predicate by referring to the information on the grammatical structure, as a candidate abstract word; substituting a relevant word for a complex noun phrase or a predicate phrase from the candidate abstract words by referring to a predetermined database; and generating an abstract by rearranging the candidate abstract words according to a predetermined rule.

14 Claims, 8 Drawing Sheets

FOREIGN PATENT DOCUMENTS

| | | |
|---|---|---|
| KR | 2000-0063488 | 11/2000 |
| KR | 2002-0058639 | 7/2002 |
| KR | 2003-0039575 | 5/2003 |
| KR | 2003-0042523 | 6/2003 |
| KR | 10-2004-0054308 | 6/2004 |
| KR | 10-0451004 | 9/2004 |
| WO | 00/14651 | 3/2000 |
| WO | 2005/001715 | 1/2005 |

* cited by examiner

FIG. 2

UNIT NEWS
- ANDREW STEVENS, CNN ANCHOR: IT'S CONSIDERED TO BE A PREVIEW[1] TO THE OSCARS[2]. SIBILA VARGAS NOW TAKES A TRIP DOWN THE RED CARPET[3] FOR A LOOK AT WHO TOOK THE TOP HONORS[4] AT THE GOLDEN GLOBE AWARDS. — 201
- SIBILA VARGAS, CNN CORRESPONDENT: THE BIG WINNER OF THE NIGHT, BROKEBACK MOUNTAIN. THE FILM ABOUT TWO GAY COWBOYS TOOK THE GOLDEN GLOBE AWARDS IN FOUR OUT OF THE SEVEN CATEGORIES[5] IN WHICH IT HAD RECEIVED NOMINATIONS[6], INCLUDING BEST DRAMATIC PICTURE[7]. — 202
- JAMES SCHAMUS, PRODUCER OF BROKEBACK MOUNTAIN: WE ARE STUNNED[8] IN THANKS TO THE HOLLYWOOD FOREIGN PRESS (ASSOCIATION)[9]. — 203

DATA SUMMARIZATION METHOD AND APPARATUS

CROSS-REFERENCE TO RELATED APPLICATION

This application claims priority from Korean Patent Application No. 10-2006-0049748, filed on Jun. 2, 2006, in the Korean Intellectual Property Office, the disclosure of which is incorporated herein by reference.

BACKGROUND OF THE INVENTION

1. Field of the Invention

The present invention relates to a data summarization method and apparatus, and more particularly, to a method and apparatus for generating a suitable abstract by analyzing a morpheme and grammatical structure of a caption.

2. Description of the Related Art

Due to development of data compression and data transmission technologies, an increasing amount of multimedia data is being generated and transmitted. Due to a large number of multimedia data capable of being accessed on Internet, it is very difficult to retrieve desired multimedia data. Also, many users want to receive only important information in a short time via an abstract of data, which is made by summarizing multimedia data. In response to requests of users, there are provided various methods of generating an abstract of multimedia data. From the methods of generating an abstract of multimedia data, there is a method of generating an abstract by extracting a noun from closed caption text. However, the abstract generated by extracting a noun is too long and is not refined to be provided to users. Also, since there is no context because of extracting only a noun, a meaning of the abstract cannot be precisely conveyed. For example, when extracting only a noun from closed caption text such as "It was confirmed the artificial fish reef that was installed in order to protect marine resources cannot do its job", awkward abstract content is extracted such as "fish reef, resources, and job".

Also, in a conventional method of generating an abstract by recognizing a caption added to video data, since a caption has to be directly recognized and processed from video data, an amount of data that has to be processed to generate the abstract is increased. Also, since a caption included in the video data is generally made to be condensed in order to convey content together with the video data, a text of the caption may not precisely reflect the content.

Accordingly, a data summarization method and apparatus capable of generating a natural abstract by extracting an abstract word by reflecting a morpheme of a text included in a closed caption, grammatical structure, a meaning of a word, and rearranging the extracted abstract words in a form suitable for recognition are required.

SUMMARY OF THE INVENTION

Additional aspects and/or advantages of the invention will be set forth in part in the description which follows and, in part, will be apparent from the description, or may be learned by practice of the invention.

An aspect of the present invention provides a summarization method and apparatus capable of generating a natural abstract by extracting an abstract word by reflecting a morpheme, a grammatical structure, and a meaning of a word of a text included in a caption, and rearranging the extracted abstract words in a form suitable for recognizing content.

An aspect of the present invention also provides a summarization method and apparatus providing a more condensed and natural abstract, thereby providing a text abstract in various environments of receiving videos, such as a TV watched from a long distance, and a terminal with a small screen.

An aspect of the present invention also provides a summarization method and apparatus extracting and removing low content words from a target text, thereby quickly determining a subject and a predicate.

An aspect of the present invention also provides a summarization method and apparatus generating a more natural abstract by replacing a candidate abstract word with a corresponding substitution.

An aspect of the present invention also provides a summarization method and apparatus generating a more natural abstract by extracting and rearranging a word according to the 5W1H rule based on case information of words included in a text.

An aspect of the present invention also provides a summarization method and apparatus providing information requested by a user and providing only desired contents by providing caption analysis and an abstract of a caption included in contents.

According to an aspect of the present invention, there is provided a method of generating caption abstract, including: generating a target text from a predetermined caption, analyzing a morpheme of a word included in the target text, and analyzing a grammatical structure of the target text by referring to the morpheme; extracting and removing low content words from the target text by using the morpheme or information on the grammatical structure and determining a main predicate; extracting a major sentence component with respect to the main predicate by referring to the information on the grammatical structure, as a candidate abstract word; substituting a relevant word for a complex noun phrase or a predicate phrase from the candidate abstract words by referring to a predetermined database; and generating an abstract by rearranging the candidate abstract words according to a predetermined rule.

According to another aspect of the present invention, there is provided an apparatus for generating caption abstract, including: a preprocessor generating a target text from a predetermined caption; a word extractor analyzing a morpheme of a word included in the target text, analyzing a grammatical structure of the target text by referring to the morpheme, extracting and removing low content words from the target text by using the morpheme or information on the grammatical structure, determining a main predicate, and extracting a major sentence component with respect to the main predicate by referring to the information on the grammatical structure, as a candidate abstract word; and an abstract generator substituting a relevant word for a complex noun phrase or a predicate phrase from the candidate abstract words by referring to a predetermined database and generating an abstract by rearranging the candidate abstract words according to a predetermined rule.

According to an aspect of the present invention, there is provided that a method of generating caption abstract, including: generating a target text from a predetermined caption, analyzing a morpheme of a word included in the target text, and analyzing a grammatical structure of the target text by referring to the morpheme; determining a main predicate using the morpheme or information on the grammatical structure; extracting a major sentence component with respect to the main predicate by referring to the information on the grammatical structure, as a candidate abstract word; and generating an abstract by rearranging the candidate abstract words according to a predetermined rule.

BRIEF DESCRIPTION OF THE DRAWINGS

The above and/or other aspects and advantages of the present invention will become apparent and more readily appreciated from the following detailed description, taken in conjunction with the accompanying drawings of which:

FIG. 2 is a diagram illustrating a parsed caption according to an embodiment of the present invention;

DETAILED DESCRIPTION OF THE PREFERRED EMBODIMENTS

Figure 1:
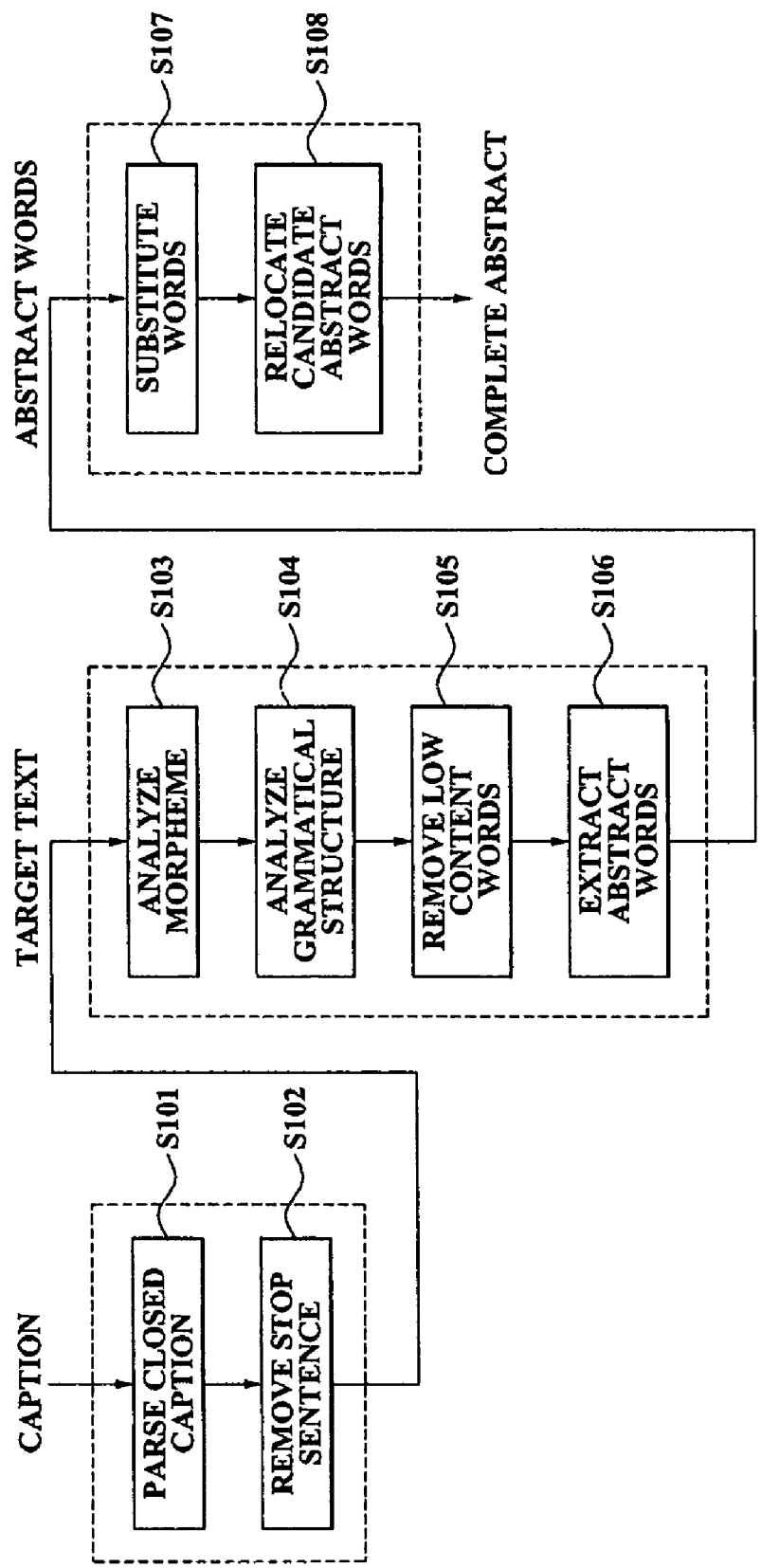
FIG. 1 is a flowchart illustrating a process of generating an abstract from a caption, according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a flowchart illustrating a process of generating an abstract from a caption, according to an embodiment of the present invention. Referring to FIG. 1, the process of generating a caption abstract is as follows.

In operation S101, an abstract generating apparatus segments an inputted caption into a predetermined unit text by using tagger information or structure information of the caption and parses the inputted caption by classifying and extracting text included in the unit text in an order of importance according to an embodiment of the present invention.

The caption in the present invention is a concept including all information that is inputted to the abstract generating apparatus and becomes an object of the abstract. For example, the caption may include closed captioned text for the deaf.

Since the caption may include tagger information and/or structure information, the abstract generating apparatus may segment the caption into a unit text by using the tagger information or the structure information.

FIG. 2 is a diagram illustrating a parsed caption according to an embodiment of the present invention. Referring to FIG. 2, the abstract generating apparatus divides a caption into an anchor text 201, a correspondent text 202, and an interview text 203 by using tagger information or structure information and segments a series of text sections into a unit text that is a unit news section in FIG. 2.

The abstract generating apparatus parses a caption by classifying and extracting text included in the unit text in an order of importance. For example, text included in the unit text may be classified and extracted in an order of an anchor text, a correspondent text, and an interview text by assigning significance.

In operation S102, the abstract generating apparatus generates a target text by removing a stop sentence from the caption. For example, the abstract generating apparatus defines and removes unnecessary greetings and comments of feelings as the stop sentence from the caption, thereby generating the target text. The target text indicates text that becomes an object of the abstract.

In operation S103, the abstract generating apparatus analyzes a morpheme of a word included in the target text and analyzes a grammatical structure of the target text by referring to morpheme information using the analyzed morpheme of a word.

Figure 3:
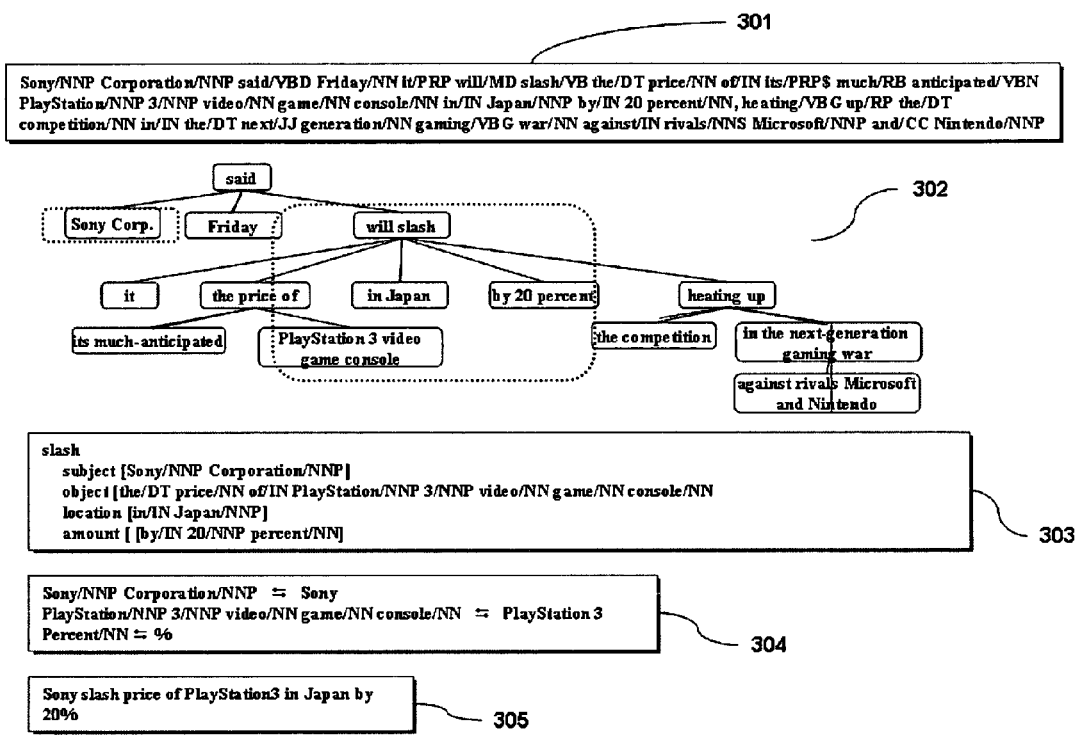
FIG. 3 is a diagram illustrating an example of analyzing a morpheme and a grammatical structure of a target text, according to an embodiment of the present invention.

FIG. 3 is a diagram illustrating an example of analyzing a morpheme and a grammatical structure of a target text, according to an embodiment of the present invention. Referring to FIG. 3, the abstract generating apparatus determines a part of speech of each word by analyzing the morpheme of the target text as shown in block 301.

A morpheme of a word may be analyzed by referring to a dictionary. For example, a part of speech of a word included in a target text, thereby performing morphological analysis. For example, 'video', 'game', 'console', and 'competition' are determined to be nouns NN and 'of' is determined to be a preposition IN.

Also, in operation S104 of FIG. 1, the abstract generating apparatus analyzes the grammatical structure of a text sentence in which a part of speech is determined, by using the determined part of speech and determines a case of a phrase included in the target text. For example, the grammatical structure included in the target text may be analyzed as shown in block 302.

In operation S105, the abstract generating apparatus extracts and removes low content words from the target text by using the morpheme and the grammatical structure and determines a subject and a predicate.

According to an aspect of the present invention, the low content words are a phrase associated with a peripheral predicate that is not an object of the abstract from the target text, and a main predicate is an object of the abstract from the target text. For example, 'confirmed as that', 'it is safe to say that', and 'is the talk of' may be classified and extracted as low content words.

Thus, according to an embodiment of the present invention, low content words are extracted and removed from the target text, thereby quickly determining a main predicate.

In operation S106, the abstract generating apparatus extracts a major sentence component of the main predicate or a major adjunct of the major sentence component, as a candidate abstract word.

According to embodiments, the major sentence component may be a sentence component corresponding to the 5W1H rule with respect to a main predicate and the major adjunct may be a noun—noun adjunct, an adjective clause—noun adjunct, a possessive case adjunct, or a parataxis adjunct. The definition with respect to the major sentence component may be variously available according to embodiments of the present invention.

For example, in FIG. 3, the major sentence component with respect to 'will slash' determined to be a main predicate and a major adjunct with respect to the major sentence component may be determined as shown in block 303.

In operation S107, the abstract generating apparatus replaces a complex noun phrase or a predicate from the candidate abstract words by a corresponding substitution.

Figure 4:
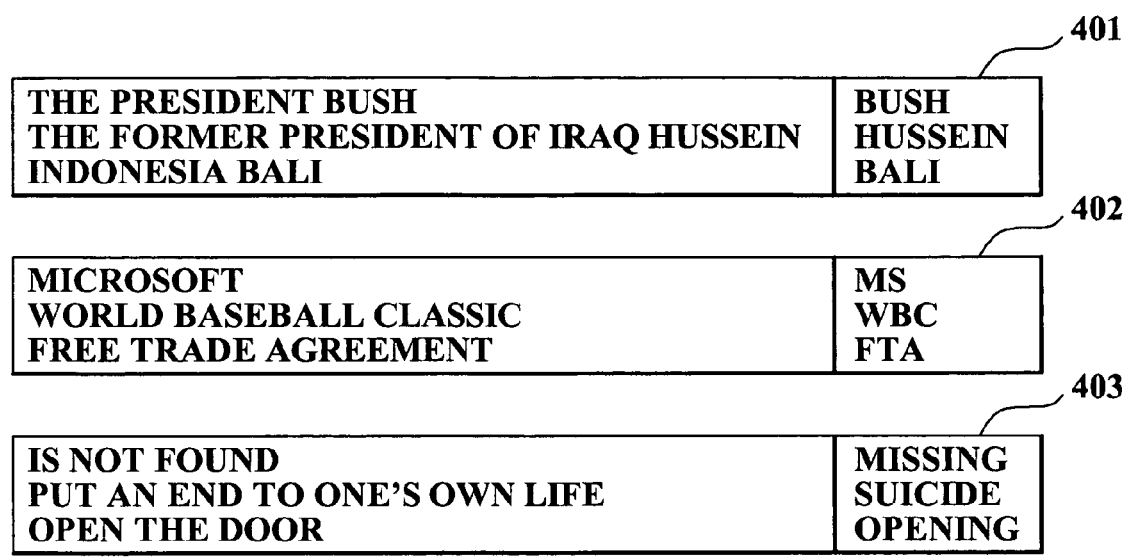
FIG. 4 is a diagram illustrating an example of replacing a candidate abstract word with a substitution, according to an embodiment of the present invention.

FIG. 4 is a diagram illustrating an example of replacing a candidate abstract word with a substitution, according to an embodiment of the present invention. Referring to FIG. 4, as shown in blocks 401, 402, and 403, a substitution corresponding to each abstract word is maintained in a database. When a corresponding abstract word is extracted, the abstract word is substituted with a substitution.

For example, when candidate abstract words indicating a position such as 'the President Bush' are included, 'the President' is omitted and 'Bush' substitutes for 'the President Bush'. Also, when there is a generally used abbreviate word as a case of 'Microsoft', 'MS' substitutes for 'Microsoft'. Also, 'is not found' is replaced by 'missing'. Also, in FIG. 3, 'Sony Corporation' may be replaced with 'Sony' 304. In this case, a type and a number of substitutions recorded and maintained in the database can be variously established.

Accordingly, a more natural abstract may be generated by replacing candidate abstract words with substitutions.

In operation S108, the abstract generating apparatus generates an abstract by relocating the candidate abstract words according to a predetermined rule.

Figure 5:
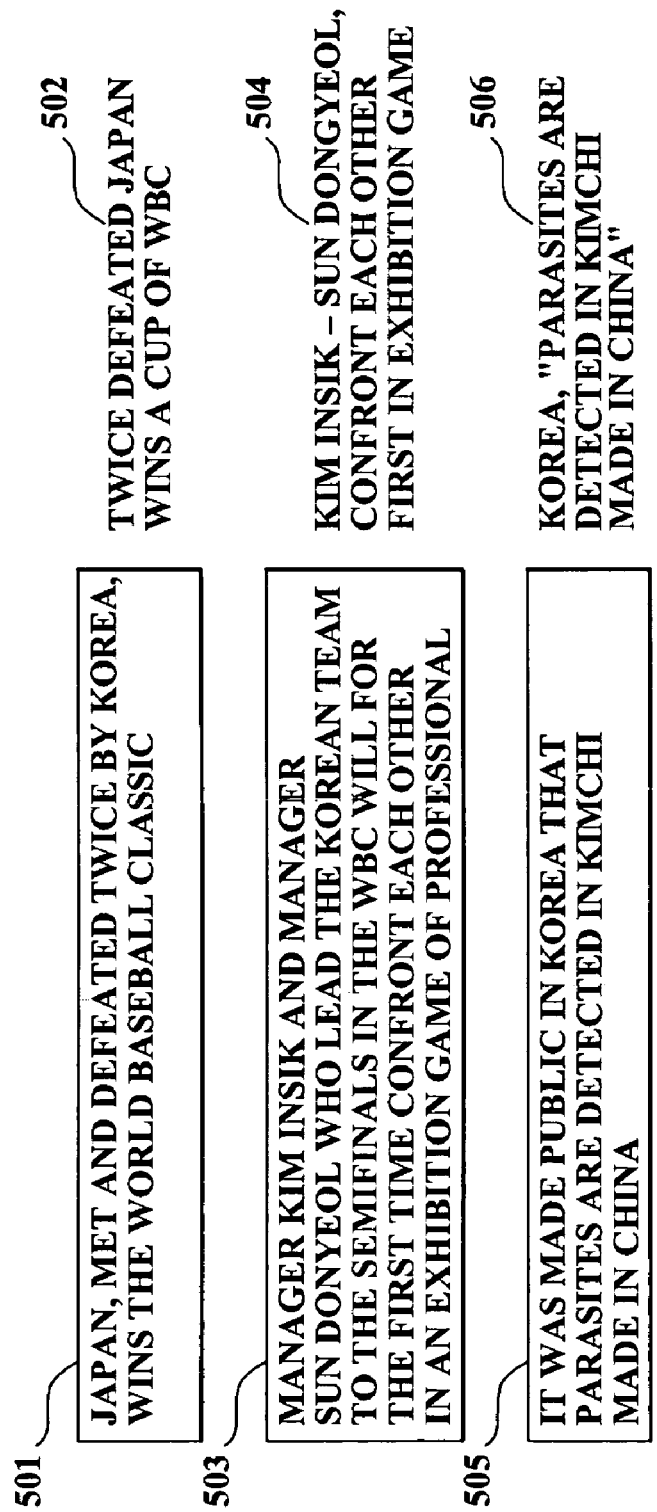
FIG. 5 is a diagram illustrating an abstract generated by rearranging candidate abstract words, according to an embodiment of the present invention.

FIG. 5 is a diagram illustrating an abstract generated by rearranging candidate abstract words, according to an embodiment of the present invention. Referring to FIG. 5, the abstract generating apparatus may generate an abstract by rearranging a word order by determining a part of speech of candidate abstract words, connecting words having something in common with the candidate abstract words, and adding quotation marks by determining quotations from the candidate abstract words.

For example, 'twice defeated Japan' that is a subject of a sentence in a target text 501 is disposed in front of 'wins the WBC' that is a predicate, thereby generating a more natural abstract as shown in an abstract 502. Also, a target text 503, 'a manager Sun Dongyeol' and 'a manager Kim InSik' that have a position identical with each other and have something in common are connected with each other by '-', thereby generating more condensed abstract. Also, in a target text 505, when a quotation such as 'announce as' is detected, the quoted part is processed to be quotation marks "" as shown in an abstract 506, thereby generating a more precise abstract.

Figure 6:
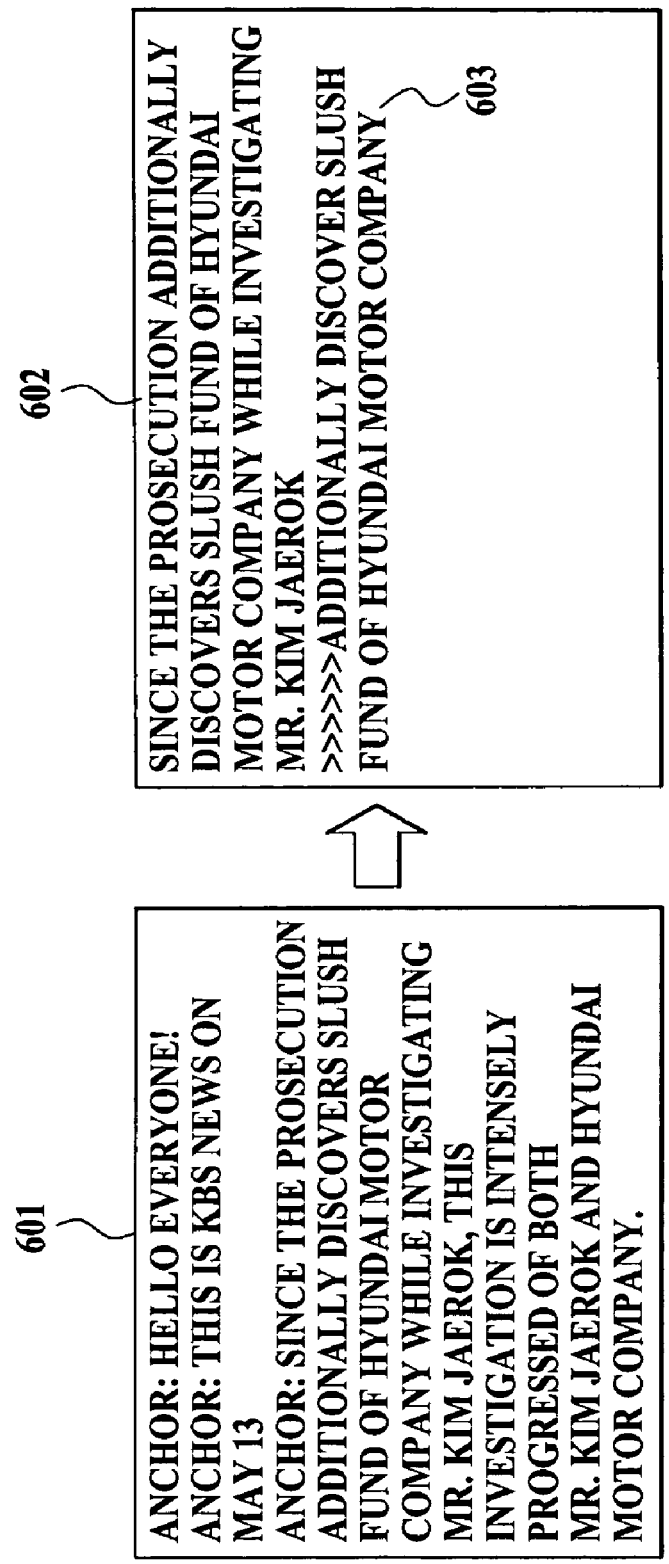
FIG. 6 is a diagram illustrating a result of generating an abstract of a caption, according to an embodiment of the present invention.

FIG. 6 is a diagram illustrating a result of generating an abstract of a caption, according to an embodiment of the present invention. Referring to FIG. 6, a caption 601 is processed by using the summarization method shown in FIG. 1, thereby a more natural and precise abstract is obtained. For example, according to a conventional technology, a target text 602 may be summarized by extracting nouns, such as "Prosecution slush fund Hyundai Motor Company Mr. Kim Jaerok, ", which is awkward. However, according to the present invention, as shown in an abstract 603, a natural and precise abstract is generated such as "additionally discover slush fund of Hyundai Motor Company".

An aspect of the present invention also provides a summarization method and apparatus providing a more condensed and natural abstract, thereby providing a text abstract in various environments of receiving videos, such as a TV watched from a long distance and a terminal with a small screen.

An aspect of the present invention also provides a summarization method and apparatus generating a more natural abstract by extracting and rearranging a word according to the 5W1H rule based on case information of words included in a text.

An aspect of the present invention also provides a summarization method and apparatus providing information requested by a user and providing only desired contents by providing caption analysis and an abstract of a caption included in contents.

Figure 7:
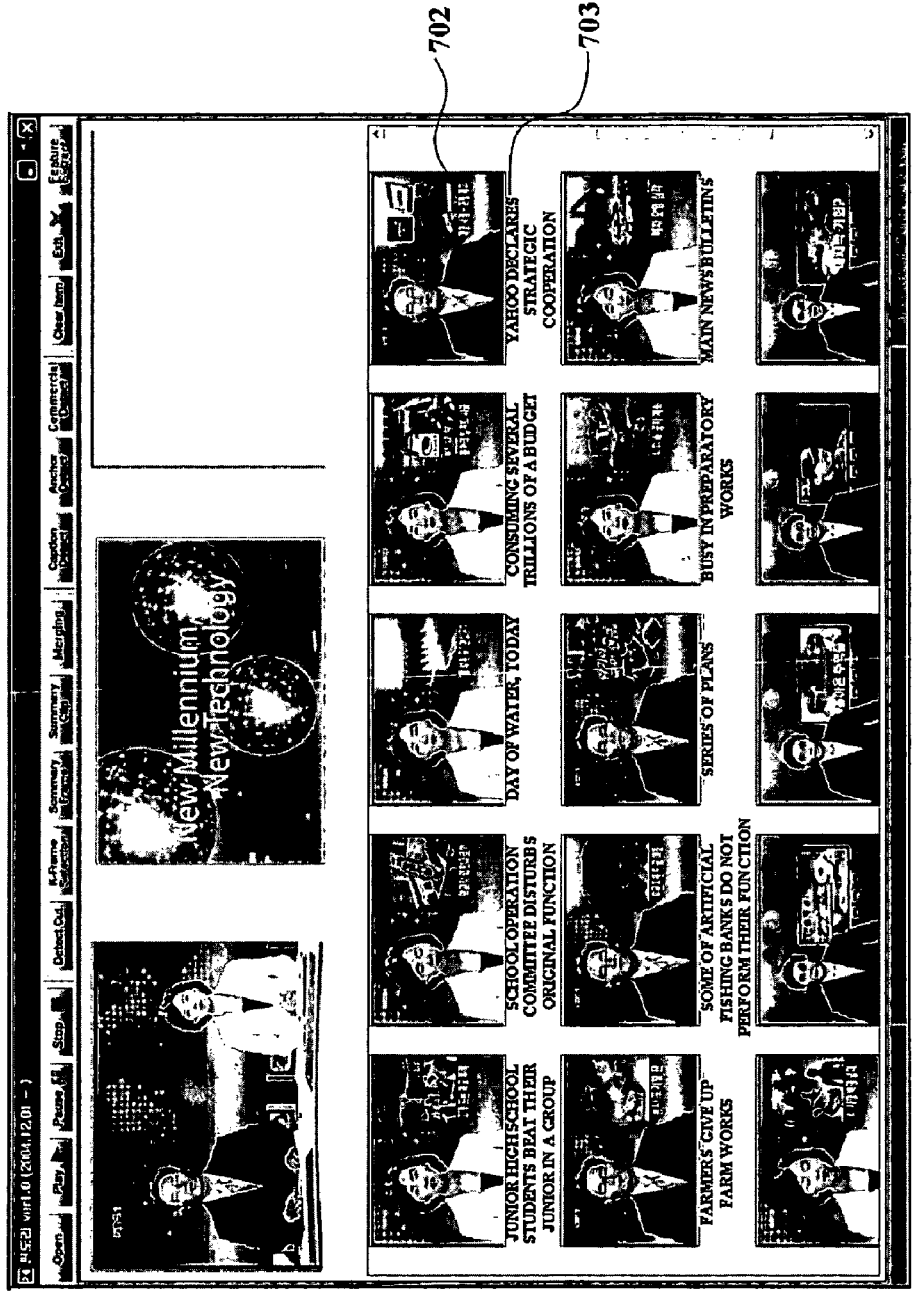
FIG. 7 is a diagram illustrating an example of outputting a generated abstract in video data, according to an embodiment of the present invention.

FIG. 7 is a diagram illustrating an example of outputting a generated abstract in video data, according to an embodiment of the present invention. Referring to FIG. 7, an abstract 703 generated by the abstract generating apparatus is synchronized to video data 702, thereby providing a more condensed and precise abstract together with the video data to a user.

The summarization method according to the present invention may be embodied as a program instruction capable of being executed via various computer units and may be recorded in a computer-readable recording medium. The computer-readable medium may include a program instruction, a data file, and a data structure, separately or cooperatively. The program instructions and the media may be those specially designed and constructed for the purposes of the present invention, or they may be of the kind well-known and available to those skilled in the art of computer software arts. Examples of the computer-readable media include magnetic media (e.g., hard disks, floppy disks, and magnetic tapes), optical media (e.g., CD-ROMs or DVD), magneto-optical media (e.g., optical disks), and hardware devices (e.g., ROMs, RAMs, or flash memories, etc.) that are specially configured to store and perform program instructions. Examples of the program instructions include both machine code, such as produced by a compiler, and files containing high-level language codes that may be executed by the computer using an interpreter. The hardware elements above may be configured to act as one or more software modules for implementing the operations of this invention.

Figure 8:
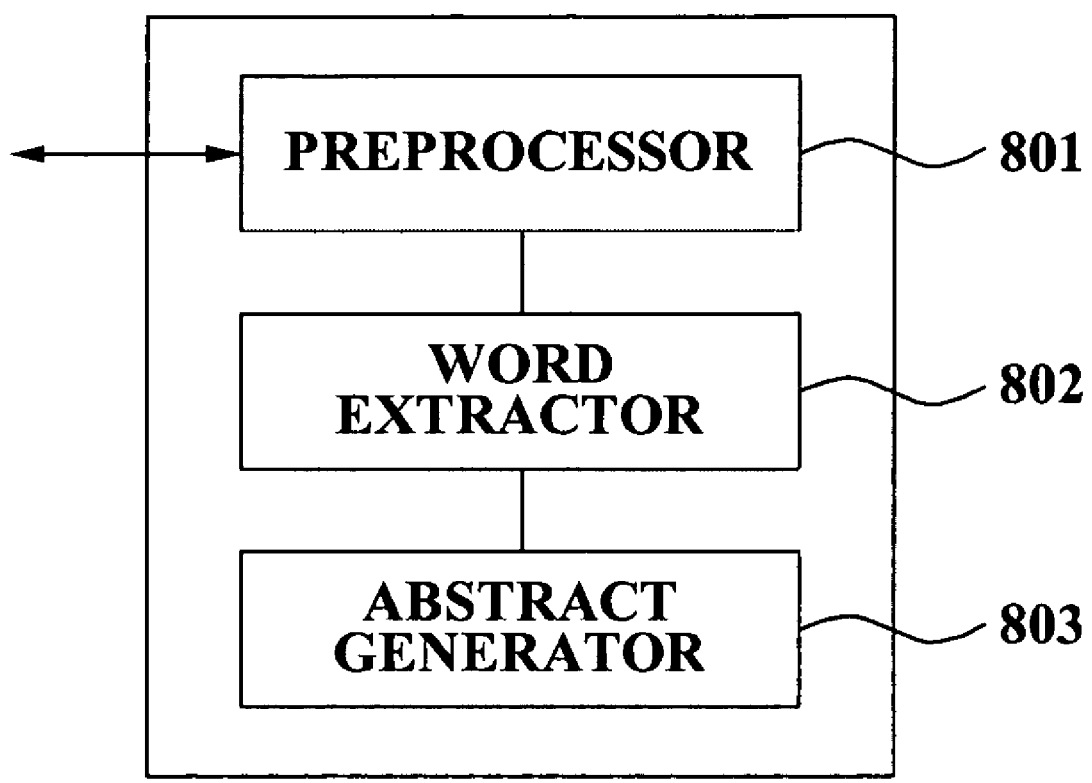
FIG. 8 is a block diagram illustrating a configuration of an abstract generating apparatus according to an embodiment of the present invention.

FIG. 8 is a block diagram illustrating a configuration of an abstract generating apparatus according to an embodiment of the present invention. Referring to FIG. 8, the abstract generating apparatus may include a preprocessor 801, a word extractor 802, and an abstract generator 803.

The preprocessor 801 generates a target text from a predetermined caption. The preprocessor 801 may generate the target text by parsing the predetermined caption and removing a stop sentence from the predetermined caption. Also, the preprocessor 801 segments the predetermined caption into a predetermined unit text by using tagger information or structure information in the caption and parses the predetermined caption by classifying and extracting text included in the unit text in an order of importance.

The word extractor 802 analyzes a morpheme of a word included in the target text, analyzes a grammatical structure of the target text by referring to the morpheme, extracts and removes low content words from the target text by using the morpheme or information on the grammatical structure, determines a main predicate, and extracts, as a candidate abstract word, a major sentence component with respect to the main predicate by referring to the information on the grammatical structure.

Also, the word extractor 802 extracts a major adjunct with respect to the major sentence component as a candidate abstract word, determines a part of speech of a word included in the target text, analyzes a grammatical structure of the target text by using the determined part of speech information, and determines a case of a phrase included in the target text by using the analyzed grammatical structure.

The abstract generator 803 substitutes a relevant word for a complex noun phrase or a predicate phrase from the candidate abstract words by referring to a predetermined database and generates an abstract by relocating the candidate abstract words according to a predetermined rule. According to the predetermined rule, a word order is rearranged by determining a part of speech of the candidate abstract word, words having something in common with the candidate abstract words are connected, and quotation marks are added by determining a quotation from the candidate abstract words, thereby generating an abstract.

An aspect of the present invention provides a summarization method and apparatus capable of generating a natural abstract by extracting an abstract word by reflecting a morpheme, a grammatical structure, and a meaning of a word of a text included in a caption, and rearranging the extracted abstract words in a form suitable for recognizing content.

An aspect of the present invention also provides a summarization method and apparatus providing a more condensed and natural abstract, thereby providing a text abstract in various environments of receiving videos, such as a TV watched from a long distance, and a terminal with a small screen.

An aspect of the present invention also provides a summarization method and apparatus extracting and removing low content words from a target text, thereby quickly determining a subject and a predicate.

An aspect of the present invention also provides a summarization method and apparatus generating a more natural abstract by replacing a candidate abstract word with a corresponding substitution.

An aspect of the present invention also provides a summarization method and apparatus generating a more natural abstract by extracting and rearranging a word according to the 5W1H rule based on case information of words included in a text.

An aspect of the present invention also provides a summarization method and apparatus providing information requested by a user and providing only desired contents by providing caption analysis and an abstract of a caption included in contents Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method implemented in a computer system having a processor and a memory for generating caption abstract, comprising:
   generating, by the computer system, a target text from a caption;
   removing low content words from the target text and determining a main predicate, by the computer system;
   determining, by the computer system, a major sentence component with respect to the main predicate as a candidate abstract word; and
   generating, by the computer system, an abstract by rearranging the candidate abstract words, wherein the generating the abstract by rearranging the candidate abstract words comprises performing one of the operations of:
   adjusting a word order by determining a case of the candidate abstract word;
   expressing by connecting words having commonality from the candidate abstract words; and
   determining a quote from the candidate abstract words and adding quotation marks.

2. The method of claim 1, wherein the generating, by the computer system, a target text from a predetermined caption comprises parsing the caption and generating the target text by removing a stop sentence from the caption.

3. The method of claim 2, wherein the parsing the caption comprises:
   segmenting the caption into a unit text by using tagger information or structure information in the caption; and
   classifying and extracting text included in the unit text in an order of importance.

4. The method of claim 1, further comprising extracting, by the computer system, a main modification element with respect to the major sentence component as the candidate abstract word.

5. The method of claim 1, further comprising:
   determining, by the computer system, a part of speech of the word included in the target text;
   analyzing, by the computer system, the grammatical structure of the target text by using information of the determined part of speech; and
   determining, by the computer system, a case of a phrase included in the target text by using the analyzed grammatical structure.

6. The method of claim 1, wherein the predetermined caption further comprises closed captioned text for the deaf.

7. A computer-readable recording medium in which a method of generating caption abstract is recorded, the method comprising:
   generating a target text from a caption;
   removing low content words from the target text and determining a main predicate;
   determining a major sentence component with respect to the main predicate as a candidate abstract word; and
   generating an abstract by rearranging the candidate abstract words, wherein the generating the abstract by rearranging the candidate abstract words comprises performing one of the operations of:
   adjusting a word order by determining a case of the candidate abstract word;
   expressing by connecting words having commonality from the candidate abstract words; and
   determining a quote from the candidate abstract words and adding quotation marks.

8. An apparatus for generating caption abstract, comprising:
   a preprocessor generating a target text from a caption;
   a word extractor removing low content words from the target text, determining a main predicate, and determining a major sentence component with respect to the main predicate as a candidate abstract word; and
   an abstract generator generating an abstract by rearranging the candidate abstract words, wherein the abstract generator generates the abstract by performing one of the operations of:
   adjusting a word order by determining a case of the candidate abstract word;
   expressing by connecting words having commonality from the candidate abstract words; and
   determining a quote from the candidate abstract words and adding quotation marks.

9. The apparatus of claim 8, wherein the preprocessor parses the caption and generates the target text by removing a stop sentence from the caption.

10. The apparatus of claim 9, wherein the preprocessor segments the caption into a unit text by using tagger information or structure information in the caption and classifies and extracts text included in the unit text in an order of importance.

11. The apparatus of claim 8, wherein the word extractor extracts a main modification element with respect to the major sentence component as the candidate abstract word.

12. The apparatus of claim 8, wherein the word extractor determines a part of speech of the word included in the target text; analyzes the grammatical structure of the target text by using information of the determined part of speech; and determines a case of a phrase included in the target text by using the analyzed grammatical structure.

13. A method implemented in a computer system having a processor and a memory for generating caption abstract, comprising:

generating, by the computer system, a target text from a predetermined caption, analyzing a morpheme of a word included in the target text, and analyzing a grammatical structure of the target text by referring to the morpheme;

determining, by the computer system, a main predicate using the morpheme or information on the grammatical structure;

extracting, by the computer system, a major sentence component with respect to the main predicate by referring to the information on the grammatical structure, as a candidate abstract word; and generating, by the computer system, an abstract by rearranging the candidate abstract words, wherein the generating the abstract by rearranging the candidate abstract words comprises performing one of the operations of:

adjusting a word order by determining a case of the candidate abstract word;

expressing by connecting words having commonality from the candidate abstract words; and determining a quote from the candidate abstract words and adding quotation marks.

14. The method of claim 13, further comprising:

substituting a relevant word for a complex noun phrase or a predicate phrase from the candidate abstract words by referring to a predetermined database.

\* \* \* \* \*